United States Patent [19]
Ettischer

[11] 3,898,682
[45] Aug. 5, 1975

[54] PIVOTING BLADE SHUTTER FOR PHOTOGRAPHIC PURPOSES

[75] Inventor: Helmut Ettischer, Ruit, Germany

[73] Assignee: Eastman Kodak Company, Rochester, N.Y.

[22] Filed: Dec. 18, 1973

[21] Appl. No.: 425,898

[30] Foreign Application Priority Data
Dec. 22, 1972 Germany............................ 2262960

[52] U.S. Cl. ................. 354/253; 354/250; 354/251
[51] Int. Cl.² ...................... G03B 9/16; G03B 9/26
[58] Field of Search .......... 354/250, 251, 254, 256, 354/207, 253

[56] References Cited
UNITED STATES PATENTS
3,489,070    1/1970    Fauth................................. 354/207
3,661,066    5/1972    Ettischer et al..................... 354/251

FOREIGN PATENTS OR APPLICATIONS
1,057,320    2/1967    United Kingdom................. 354/256

Primary Examiner—Samuel S. Matthews
Assistant Examiner—Russell E. Adams, Jr.
Attorney, Agent, or Firm—T. H. Close

[57] ABSTRACT

A shutter mechanism comprises an aperture closing blade eccentrically mounted on and movable with an aperture opening blade. The closing blade remains in its open position due to its own inertia until the opening blade has cleared the exposure aperture.

4 Claims, 3 Drawing Figures

PIVOTING BLADE SHUTTER FOR PHOTOGRAPHIC PURPOSES

BACKGROUND OF THE INVENTION

1. Field of the Invention

This invention relates to camera shutter mechanisms, and in particular to shutter mechanisms having spring operated opening and closing blades.

2. Description of the Prior Art

In known shutters of the type having spring operated opening and closing blades the driving mechanisms for movement of the opening blade and movement of the closing blade must be rendered operative before release of the shutter. Moreover, movement of the closing blade necessitates the provision of mechanical, electromagnetic, or other holding or delay means for timed release of the closing blade.

It has been found that provision of such holding or delay means adds to the cost of simple types of cameras where it is desirable to produce the shutters as inexpensively as possible.

SUMMARY OF THE INVENTION

It is an object of this invention to provide a shutter which is inexpensive yet retains the desirable features of a shutter of the aforementioned type.

Another object of the invention is to eliminate the need for holding or delay means used with prior shutter mechanisms for holding the closing blade against movement in a shutter-closing direction after the shutter-opening blade is moved for opening the shutter.

According to a preferred embodiment of the present invention, a camera shutter has a movably mounted opening blade with a closing blade hinged thereto in such a way that when the opening blade moves to uncover the exposure aperture the closing blade first remains behind as an inert body. Then a weak spring acting on the closing blade causes it to follow the opening blade and cover the exposure aperture after the opening blade has cleared the aperture.

The invention, and its objects and advantages, will become more apparent in the detailed description of the preferred embodiments presented below.

BRIEF DESCRIPTION OF THE DRAWINGS

In the detailed description of the preferred embodiments of the invention presented below reference is made to the accompanying drawings in which.

DESCRIPTION OF THE PREFERRED EMBODIMENTS

Photographic cameras being well known in the art, the present description will be limited to those elements forming part of, or cooperating directly with the present invention, the elements of a camera not shown or described herein being understood to be selected from those known in the art.

Figure 1:
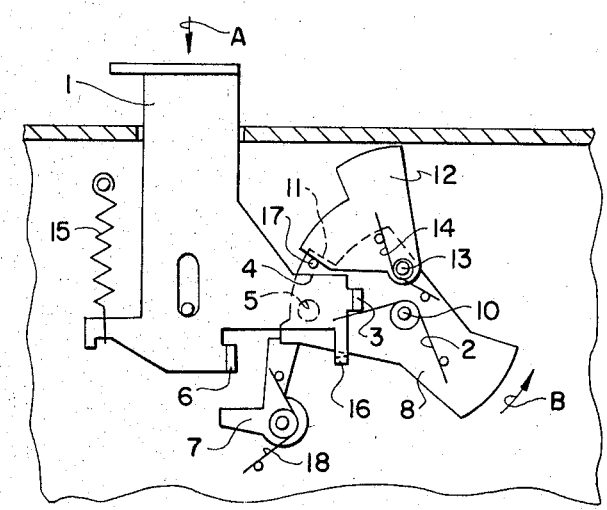
FIG. 1 shows schematically a shutter mechanism constructed in accordance with the present invention, with the elements shown in a cocked position and ready for initiating an exposure.

Referring now to the drawings, FIG. 1 shows a shutter mechanism of this invention in a cocked position ready for an exposure. When camera release member 1 is actuated in the direction of arrow A, it tensions a shutter-driving spring 2 via lug 3. As release member 1 travels in direction A, an arm portion having an edge 4 clears the camera exposure aperture 5, whereupon a lug 6 of the camera release member contacts and pivots a shutter latch 7. An opening blade 8 of the shutter is engaged and held by latch 7 in the position shown in FIG. 1 until the lug trips the latch. Then latch 7 releases blade 8, and the blade is urged by the force of a shutter-driving spring 2 (now tensioned) to swing about pivot 10 in the direction of arrow B so that edge 11 of the blade clears exposure aperture 5, thereby opening the shutter as shown in FIG. 2.

A closing blade 12 is pivotally and eccentrically mounted on said opening blade 8 by means of a pivot 13. A weak closing spring 14 for blade 12 is weaker than the shutter driving spring 2. When the elements are in their respective FIG. 1 positions, the light force exerted by spring 14 is sufficient to urge blade 12 toward a pin 17 on blade 8. The ends of the arms of spring 14 bear against stops on shutter blades 8 and 12 so that the magnitude of the tension in spring 14 increases in response to movement of blade 8 from its FIG. 1 position to its FIG. 2 position.

Figure 2:
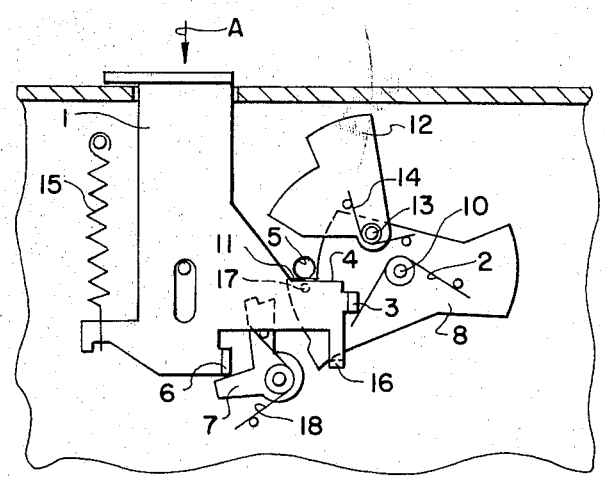
FIG. 2 is a schematic view similar to FIG. 1 but showing the elements during exposure.
Figure 3:
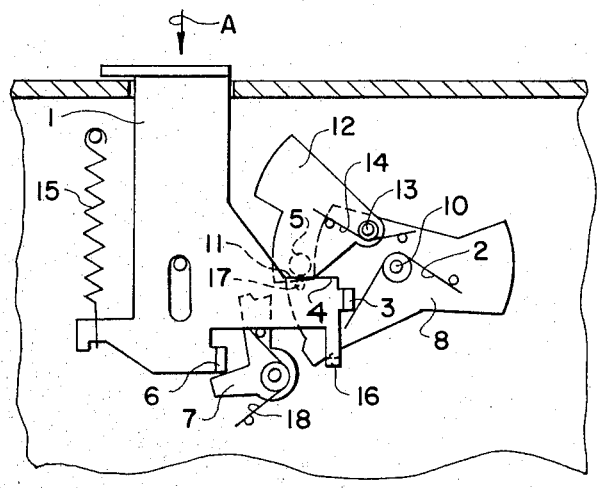
FIG. 3 is a schematic view similar to FIGS. 1 and 2 but showing the elements in an uncocked position after exposure has been terminated.

In operation, blade 8 is accelerated rapidly by spring 2 when member 1 is depressed, thereby opening the shutter mechanism as shown in FIG. 2. Since pivot 13 for blade 12 is mounted on blade 8, there is some shifting of blade 12 as is apparent from a comparison of FIGS. 1 and 2. Except for this slight shifting, blade 12 initially acts as an inert body and resists movement to its shutter-closing position shown in FIG. 3. This resistance to movement is due solely to the inertia of blade 12 and is only momentary, but is sufficient for film to be exposed through aperture 5. Then spring 14 overcomes the inertia of the closing blade 12 and the blade follows the opening blade 8 to terminate the exposure operation by covering exposure aperture 5. At this point in the operation cycle the elements are in the positions shown in FIG. 3.

As is apparent from the above description, the shutter mechanism is free of any other means for preventing or delaying movement of blade 12 towards its closed position after movement of the opening blade 8 towards its open position has commenced.

When, after an exposure, the camera release member 1 is released by the camera operator, it returns to its initial position (FIG. 1) under the influence of a camera release return spring 15. During this return movement lug 16 on camera release member 1 engages opening blade 8 to return it to its initial position. Pin 17 in turn moves closing blade 12 back to its initial position. At this point spring 18 urges latch 7 back to its latching position to hold the shutter mechanism cocked so that the camera is ready to take another photograph.

In the initial position in which the system is ready for an exposure operation, the exposure aperture 5 is covered by both the opening blade 8 and the camera release member 1, thus affording double protection against leakage of light past the closed shutter.

The invention has been described in detail with particular reference to a preferred embodiment thereof, but it will be understood that variations and modifications can be effected within the spirit and scope of the invention.

I claim:

1. A shutter mechanism for covering and uncovering an exposure aperture in a photographic camera, said shutter mechanism comprising:

first shutter means for initiating an exposure, said first shutter means being movable relative to the exposure aperture between a closed position wherein said first shutter means covers the exposure aperture and an open position wherein said first shutter means uncovers the exposure aperture;

shutter drive means cooperating with said first shutter means for effecting movement of said first shutter means to its open position;

second shutter means for terminating the exposure, said second shutter means being movable relative to the exposure aperture between an open position wherein said second shutter means uncovers the exposure aperture and a closed position wherein said second shutter means covers the exposure aperture;

said first and second shutter means having cooperating means therewith for moving said second shutter means to its open position in response to movement of said first shutter means to its closed position and for restraining said second shutter means against movement toward its closed position until said first shutter means begins to move from its closed position to its open position; and resilient means for coupling said first shutter means to said second shutter means and for biasing said second shutter means toward said closed position, said resilient means having a biasing force sufficiently less than said shutter drive means to effect relative separation between said first and second shutter means during an exposure, said shutter mechanism being free of other means for preventing or delaying movement of said second shutter means towards its closed position when said first shutter means moves toward its open position, whereby when said first shutter means is moved from its closed position to its open position by said shutter drive means, said second shutter means can momentarily remain in its open position due solely to its own inertia and then be propelled to its closed position under the influence of said resilient means.

2. A shutter mechanism for covering and uncovering an exposure aperture in a photographic camera, said shutter mechanism comprising:

a first shutter blade pivotally mounted and rotatable between a closed position wherein said first shutter blade covers the exposure aperture and an open position wherein said first shutter blade uncovers the exposure aperture;

a first spring coupled to said first shutter blade urging said first shutter blade to its open position;

a second shutter blade pivotally and eccentrically mounted on said first shutter blade, said second shutter blade being rotatable between an open position wherein said second shutter blade uncovers the exposure aperture and a closed position wherein said second shutter blade covers the exposure aperture;

a second spring connected to said first shutter blade and said second shutter blade so that it is effective when tensioned to urge said second blade toward its closed position, said second spring having a biasing force sufficiently less than said first spring to effect relative separation between said first and said second shutter blades during an exposure so that when said first shutter blade moves from its closed to its open position under the urging of said first spring, said second shutter blade can momentarily remain in its open position against the urging of said second spring due solely to its own inertia and then is propelled to its closed position by the force of said second spring, and the connection of said second spring to said first and second shutter blades being such that the tension in said second spring is increased when said first shutter blade is moving toward its open position and before said second shutter blade moves to its closed position, said shutter mechanism being free of other means for preventing or delaying movement of said second shutter blade toward its closed position when said first shutter blade moves toward its open position;

latching means for releasably holding said first shutter blade in its closed position;

release means movable between an unactuated and an actuated position and cooperating with said latching means for releasing said first shutter blade from its closed position in response to said release means being moved to its actuated position, said release means having a portion engageable with said first shutter blade for returning said first shutter blade to its closed position from its open position upon return of said release means to its unactuated position; and return means for returning said second shutter blade from its closed position to its open position in timed relationship with return of said first shutter blade from its open position to its closed position.

3. A shutter mechanism as set forth in claim 2 wherein a portion of said release means is positioned relative to the exposure aperture for covering the exposure aperture when said release means is in its unactuated position, thereby providing double protection against leakage of light past the closed shutter.

4. A shutter mechanism as set forth in claim 2 wherein said return means comprises means on said first shutter blade disposed for engagement with an edge of said second shutter blade as said first shutter blade is moved from its open position to its closed position.

* * * * *